United States Patent
Yamanaka et al.

(10) Patent No.: US 9,634,520 B2
(45) Date of Patent: Apr. 25, 2017

(54) CASE FOR MOBILE ELECTRONIC DEVICE

(71) Applicant: Sharp Kabushiki Kaisha, Osaka-shi, Osaka (JP)

(72) Inventors: Shunpei Yamanaka, Osaka (JP); Satoshi Shibata, Osaka (JP); Mehdi Shibahara, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/076,750

(22) Filed: Mar. 22, 2016

(65) Prior Publication Data

US 2016/0285305 A1    Sep. 29, 2016

(30) Foreign Application Priority Data

Mar. 25, 2015 (JP) ................................. 2015-062556

(51) Int. Cl.
*H04M 1/00* (2006.01)
*H02J 7/35* (2006.01)
*H04B 1/3888* (2015.01)
*H04M 1/18* (2006.01)
*H01M 10/46* (2006.01)
*H04M 1/02* (2006.01)
*H04B 1/3883* (2015.01)

(52) U.S. Cl.
CPC ............ *H02J 7/355* (2013.01); *H04B 1/3888* (2013.01); *H04M 1/185* (2013.01); *H01M 10/465* (2013.01); *H04B 1/3883* (2013.01); *H04M 1/0214* (2013.01); *H04M 1/0222* (2013.01)

(58) Field of Classification Search
CPC .. H04B 1/3883; H04M 1/021; H04M 1/0214; H04M 1/0222; H01M 10/465
USPC .............................. 455/572, 573, 574, 575.8
See application file for complete search history.

(56) References Cited

U.S. PATENT DOCUMENTS

| | | | |
|---|---|---|---|
| 6,847,834 B1 * | 1/2005 | Leem ................... | H04M 1/0214 136/244 |
| 2009/0007958 A1 * | 1/2009 | Ho ...................... | H01M 10/465 136/245 |
| 2009/0298554 A1 * | 12/2009 | Kim .................... | H01M 10/465 455/574 |

(Continued)

FOREIGN PATENT DOCUMENTS

| | | |
|---|---|---|
| JP | 2007-127980 A | 5/2007 |
| JP | 2013-065426 A | 4/2013 |

(Continued)

*Primary Examiner* — Duc M Nguyen
(74) *Attorney, Agent, or Firm* — Keating & Bennett, LLP (57) ABSTRACT

A case for a mobile electronic device is a case for a mobile electronic device which is capable of accommodating a mobile electronic device with a display surface, and supplying electric power to the mobile electronic device, the case including: a holder section having a first face which comes in contact with at least a portion of the mobile electronic device and a second face opposite from the first face; a protection cover to cover the display surface; a solar cell module provided on the protection cover to generate electric power, the solar cell module being externally exposed when the display surface is covered by the protection cover; and a moving mechanism capable of moving the protection cover over to the second face side while maintaining the solar cell module in an externally exposed state.

14 Claims, 8 Drawing Sheets

(56) References Cited

U.S. PATENT DOCUMENTS

| | | | | |
|---|---|---|---|---|
| 2010/0210322 A1* | 8/2010 | Kim | ..................... | G06F 1/263 |
| | | | | 455/574 |
| 2012/0176077 A1* | 7/2012 | Oh | ..................... | H01M 10/465 |
| | | | | 320/101 |
| 2013/0084919 A1* | 4/2013 | Glynn | .................. | H04B 1/3833 |
| | | | | 455/566 |
| 2014/0228109 A1 | 8/2014 | Azuma et al. | | |

FOREIGN PATENT DOCUMENTS

| | | |
|---|---|---|
| JP | 2013-117602 A | 6/2013 |
| JP | 1478458 S | 9/2013 |
| JP | 2014-155535 A | 8/2014 |

* cited by examiner

PROTECTING　　DRAWN-OUT
POSITION　　　POSITION

CASE FOR MOBILE ELECTRONIC DEVICE

BACKGROUND

1. Technical Field

The present invention relates to a case for a mobile electronic device, and more particularly to a case for a mobile electronic device such that the case includes a solar cell module. In the present specification, examples of mobile electronic devices include: mobile phones, smartphones, tablet PCs, calculators, portable game machines, music players, electronic book terminal devices, electronic dictionaries, electronic notebooks, and so on.

2. Description of the Related Art

As mobile electronic devices gain more prevalence, various cases and covers for mobile electronic devices are being developed. A case (or a cover) for a mobile electronic device aims to protect the mobile electronic device from impacts and prevent the display section and/or the main body thereof from becoming scratched, for example. Recently, cases or covers have been marketed which not only protect mobile electronic devices from impacts and scratches, but also achieve other functions (e.g., a function of charging the mobile electronic device) while maintaining good aesthetic design.

Japanese Laid-Open Patent Publication No. 2013-65426 (hereinafter "Patent Document 1") discloses a cover for an electronic device that includes: a tray to cover the electronic device on the outside; a dye-sensitized solar cell module which is attached on the rear face of the tray so as to be externally exposed; and a secondary battery. This cover serves to protect the electronic device from impacts or falls, and while thus covering the electronic device, permits power generation with the dye-sensitized solar cell module.

Japanese Laid-Open Patent Publication No. 2014-155535 (hereinafter "Patent Document 2") and Japanese Design Registration No. 1478458 (hereinafter "Patent Document 3") disclose a case of a so-called book-cover type (which might also be called a notebook type or a pocket-book type) for a mobile information terminal device. This case protects the mobile information terminal device, and also improves the convenience of terminal device manipulation.

Figure 1:
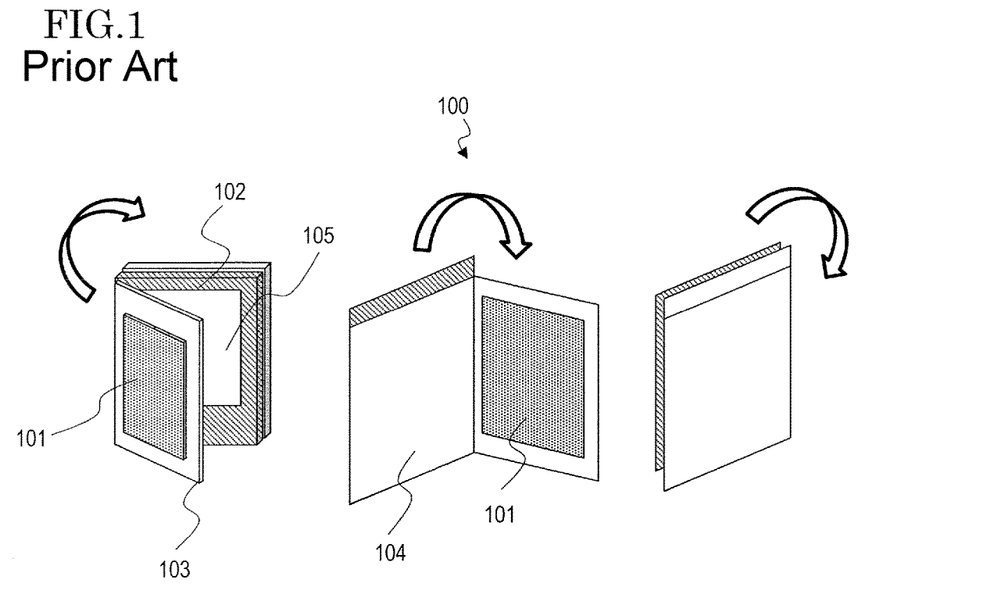
FIG. 1 is an external view schematically showing a conventional case for an electronic book.

There is also known a book-cover type case for an electronic book terminal device, such that the case includes a solar cell module. FIG. 1 schematically shows external appearances of this case 100. The case 100 for an electronic book terminal device includes a solar cell module 101 on a portion 103 that would correspond to the front cover of a book cover. An electronic book terminal device 102 is to be mounted on the inside of the book-cover type case, so as to be charged by the solar cell module 101. When the electronic book terminal device 102 is in use, the book-cover type case is opened, thereby exposing a display surface 105 of the electronic book terminal device 102. When the electronic book terminal device 102 is not in use, the book-cover type case is closed, so that the display surface 105 is covered by the portion 103 corresponding to the front cover of a book cover, whereby the display surface 105 is kept protected.

SUMMARY

In accordance with the cover for an electronic device of Patent Document 1, an opening present in the display surface (or the operating surface) of the cover hinders the cover from attaining improved surface strength in protecting the display surface. Moreover, a cover for an electronic device, when accommodating an electronic device that is not in use, is likely to be placed on a desk or a table, etc., in such a manner that its display surface faces up. In that case, the solar cell module is situated on the rear face side of the cover for the electronic device, so that hardly any light is incident on the light-receiving surface. This may significantly reduce the amount of generated power, or altogether prevent power generation.

Moreover, the book-cover type case 100 including the solar cell module 101 as shown in FIG. 1 is constructed so that the solar cell module 101 is on the portion 103 that would correspond to the front cover of a book cover. Therefore, when the electronic book terminal device 102 is not in use, the book-cover type case may be closed for protection of the display surface 105 and then placed on a desk or a table, etc., in that state, whereby the solar cell module 101 is able to generate power by receiving external light (which will mainly be direct light) or the like. Suppose a case where power is being generated while the electronic book terminal device 102 is in use; in this case, the book-cover type case is in an open state (as depicted by the middle illustration in FIG. 1). In this state, the light-receiving surface of the solar cell module faces inside the case, so that a sufficient light amount cannot be obtained. When the front cover of this book-cover type case further wraps around to the rear face side of the case, the light-receiving surface of the solar cell module is situated face-to-face with a rear face 104 of the face supporting the electronic book terminal device 102 (as depicted by the right illustration in FIG. 1). In this situation, hardly any external light is incident on the light-receiving surface, thus significantly reducing the amount of generated power.

An objective of the present invention is to efficiently carry out power generation, irrespective of the state of use of a mobile electronic device which is accommodated in a case for a mobile electronic device.

A case for a mobile electronic device according to an embodiment of the present invention is a case for a mobile electronic device capable of accommodating a mobile electronic device with a display surface, and supplying electric power to the mobile electronic device, the case comprising: a holder section having a first face which comes in contact with at least a portion of the mobile electronic device and a second face opposite from the first face; a protection cover to cover the display surface; a solar cell module provided on the protection cover to generate electric power, the solar cell module being externally exposed when the display surface is covered by the protection cover; and a moving mechanism capable of moving the protection cover over to the second face side while maintaining the solar cell module in an externally exposed state. "Moving over to the second face side" means causing the protection cover to move to a position where the angle constituted by the second face and the light-receiving surface of the solar cell module is approximately 0° to 120°. From the standpoint of ease of holding the case, this angle is preferably approximately 0° to 60°.

In one embodiment, the case for a mobile electronic device further comprises a connecting portion electrically connecting the holder section and the protection cover, the connecting portion swingingly supporting the holder section and the protection cover, wherein the holder section includes at least two supporting members which are linked with each other, and at least one fold line between respective supporting members among the at least two supporting members, one supporting member among the at least two supporting members having the first face and connecting to the connecting portion by way of the other supporting member or other supporting members swingingly connected thereto; and the solar cell module on the protection cover having moved over to the second face side is externally exposed in a state where the at least two supporting members are folded onto each other in the form of a bellows.

In one embodiment, the at least two supporting members include a first supporting member having the first face and a second supporting member; the at least one fold line is a first valley-fold line between the first and second supporting members, as viewed from the exterior; and the solar cell module on the protection cover having moved over to the second face side is externally exposed in a state where the second supporting member is folded onto the first supporting member so that the first valley-fold line flexes inward as viewed from the exterior.

In one embodiment, the connecting portion includes a second valley-fold line as viewed from the exterior.

In one embodiment, the moving mechanism includes: an expansion mechanism being fixed to the holder section and supporting the protection cover, the expansion mechanism allowing the protection cover to slide in a direction which is substantially parallel to one side of the display surface, between a protecting position in which the display surface is covered by the protection cover and a drawn-out position in which the protection cover has been pulled out of the holder section; and a rotation mechanism to, in a state where the solar cell module is externally exposed, allow the protection cover in the drawn-out position to rotate over to the second face side, around a rotation axis which is at one end of the holder section.

In one embodiment, the moving mechanism includes a rotary terminal connecting one end of the protection cover to one end of the holder section, the rotary terminal allowing the protection cover to rotate over to the second face side; the protection cover is capable of transitioning between a protecting state of covering the display surface and an open state of extending along a same substantially straight line as the holder section and not covering the display surface; and the rotary terminal pivotally supports the protection cover to allow the protection cover in the open state to pivot approximately 180° with respect to the holder section, around an axis which is substantially parallel to the substantially straight line.

In one embodiment, a rotation axis around which the protection cover is allowed to rotate over to the second face side is engaged by an interference fit.

In one embodiment, the case for a mobile electronic device further comprises a power supplying unit, the power supplying unit including a control circuit which tracks an optimum operating point of the solar cell module and supplying electric power from the solar cell module to a load.

In one embodiment, the case for a mobile electronic device further comprises a rechargeable battery to store the electric power from the solar cell module, the rechargeable battery being connected to the power supplying unit.

In one embodiment, the solar cell module is a dye-sensitized solar cell module or a solar cell module including a fluorescent light-collecting plate.

According to an embodiment of the present invention, there is provided a case for a mobile electronic device which, irrespective of the state of use of the mobile electronic device, enables efficient power generation while the mobile electronic device is being manipulated.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

A case for a mobile electronic device according to an embodiment of the present invention is capable of accommodating a mobile electronic device with a display surface, and supplying electric power to the mobile electronic device. The case includes: a holder section having a first face which comes in contact with at least a portion of the mobile electronic device and a second face opposite from the first face; a protection cover to cover the display surface; a solar cell module provided on the protection cover to generate electric power, the solar cell module being externally exposed when the display surface is covered by the protection cover; and a moving mechanism capable of moving the protection cover over to the second face side, while maintaining the solar cell module in an externally exposed state. Herein, "moving over to the second face side" means causing the protection cover to move to a position where the angle constituted by the second face and the light-receiving surface of the solar cell module is approximately 0° to 120°.

With this case for a mobile electronic device, when the mobile electronic device is not in use, power generation is possible by merely leaving the case on a desk or a table, etc., in a state where the display surface is protected. Moreover, even while the mobile electronic device is being manipulated, efficient power generation is possible in a state where the solar cell module is externally exposed. Moreover, since the mobile electronic device is to be accommodated in such a manner that it is entirely covered, it is better protected from impact in a fall or collision.

Hereinafter, with reference to the attached drawings, a case for a mobile electronic device according to an embodiment of the present invention will be described. In the following description, identical or similar constituent elements are denoted by identical reference numerals. Note that the case for a mobile electronic device according to an embodiment of the present invention is not limited to what is exemplified below. For example, it would also be possible to combine one embodiment with another embodiment.

(First Embodiment)

With reference to FIG. 2 to FIG. 5, the construction and functions of a case 200A for a mobile electronic device according to the present embodiment will be described.

Figure 2:
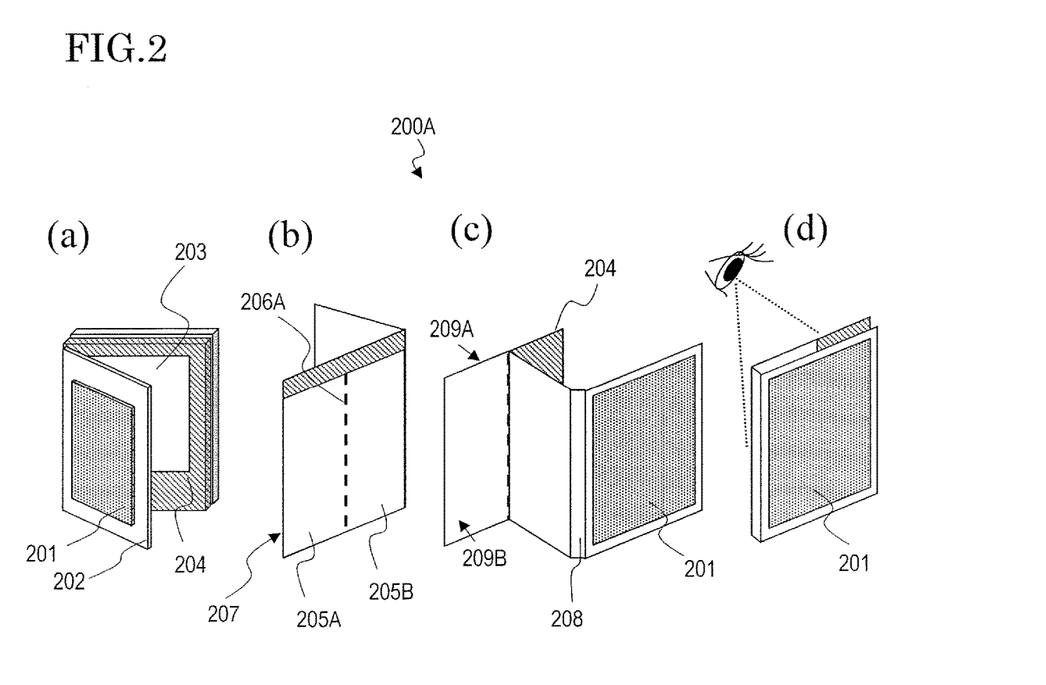
FIG. 2 is an external view schematically showing a case 200A for a mobile electronic device according to a first embodiment.

FIG. 2 schematically shows external appearances of the case 200A for a mobile electronic device. In FIG. 2, (a) shows an external appearance of the case 200A in a state where a protection cover 202 thereof is open, as the case 200A is viewed from the front; (b) and (c) show external appearances of the case 200A in states where the protection cover 202 is open, as the case 200A is viewed from the back face; and (d) shows an external appearance of the case 200A in a state where the protection cover 202 is positioned at the back face, as the case 200A is viewed from the back face.

The case 200A for a mobile electronic device includes a solar cell module 201, the protection cover 202, a holder section 207, and a connecting portion 208. As shown in the figure, the case 200A for a mobile electronic device is a book-cover type case, whose connecting portion 208 would correspond to the spine of a book cover.

The case 200A for a mobile electronic device accommodates a mobile electronic device 204 which includes a display surface 203. Via a connector (not shown), the mobile electronic device 204 is directly electrically connected to, and becomes integral with, the case 200A for a mobile electronic device. In that state, electric power which is generated by the solar cell module 201 can be supplied to the mobile electronic device 204. Specifically, the output of the solar cell module 201 is connected to the input of a power storage element in the mobile electronic device 204. Herein, the power storage element encompasses not only a so-called rechargeable battery (secondary battery), but also a capacitor of a large capacitance. In the case where the case 200A for a mobile electronic device is to be used in an integral manner with the mobile electronic device 204, the mobile electronic device 204 may not need a power storage element.

The solar cell module 201 generates electric power. The solar cell module 201 is disposed on the protection cover 202, so that it is externally exposed when the protection cover 202 covers the display surface 203. For example, when the case 200A for a mobile electronic device is placed by the window side with the display surface 203 being covered by the protection cover 202, the externally-exposed solar cell module 201 is able to receive external light to generate power.

Various solar cells can be used for the solar cell module 201. For example, silicon-type solar cell modules such as crystalline silicon solar cell modules and amorphous silicon solar cell modules, compound-type solar cell modules such as GaAs solar cell modules, solar cell modules in which a fluorescent light-collecting plate is used, and organic-type solar cell modules such as dye-sensitized solar cell modules can generally be used.

Now, illuminance dependence of the output voltage (open-circuit voltage) of each solar cell in the solar cell module will be briefly described. As illuminance lowers, the open-circuit voltage of a solar cell module decreases. At a lowered illuminance, a dye-sensitized solar cell module has a higher open-circuit voltage than does a crystalline silicon solar cell module. Moreover, voltage fluctuations against illuminance are smaller in dye-sensitized solar cell modules and solar cell modules including fluorescent light-collecting plates, than in crystalline silicon solar cell modules and amorphous silicon solar cell modules. Such characteristics of solar cell modules are described in Japanese Patent Application No. 2015-42419, which is an unpublished patent application by the Applicant. The entire disclosure thereof is incorporated herein by reference.

When such characteristics of the solar cell module are taken into consideration, it may be said that a dye-sensitized solar cell module or a solar cell module including a fluorescent light-collecting plate is preferable as the solar cell module 201. This enables efficient power generation across a broad range of illuminance from low to high.

The protection cover 202 covers and protects the display surface 203. The protection cover 202 is swingingly supported by the connecting portion 208 as described later. This allows the protection cover 202 to be opened or closed.

Although not shown, a power supplying unit which supplies electric power from the solar cell module 201 to the mobile electronic device 204 (i.e., load) is provided on the protection cover 202. The power supplying unit may include a control circuit which tracks optimum operating points of the solar cell module 201. Such a control circuit is generally referred to as an MPPT (Maximum Power Point Tracking) circuit. An optimum operating point is an operating point at which the solar cell module 201 attains a maximum output power (as a multiplication product of current and voltage). An MPPT circuit ensures that, even under changing illuminance and/or temperature, the solar cell module 201 generates power at the maximal operating point under each given situation, so that the maximum power under that situation is obtained.

The holder section 207 includes supporting members 205A and 205B which are linked with each other, as parted by a valley-fold line 206A located near the substantial center. In the present embodiment, the supporting member 205A includes a contact surface (first face) 209A which comes in contact with at least a portion of the mobile electronic device 204. The mobile electronic device 204 is supported on the contact surface of the holder section 207. The supporting member 205A connects to the connecting portion 208 by way of the supporting member 205B. In the present specification, as viewed from the exterior, or as viewed from the normal direction of the rear face 209B, any fold line that flexes inward (i.e., toward the mobile electronic device) is referred to as a "valley-fold line", and any fold line that flexes outward is referred to as a "mountain-fold line". Herein, "as viewed from the exterior" means that one is viewing the opposite face of the surface of the case 200A that covers the housing of the mobile electronic device 204.

The connecting portion 208 electrically connects the protection cover 202 and the holder section 207, swingingly supporting each. Through this electrical connection, electric power from the solar cell module 201 can be supplied to the mobile electronic device 204. Moreover, the protection cover 202 is able to wrap around to the rear face (second face) 209B, opposite from the contact surface.

As shown in (c) and (d) of FIG. 2, the supporting member 205B can be folded onto the supporting member 205A, in such a manner that the valley-fold line 206A flexes inward. The protection cover 202, having moved in a manner of wrapping around from the contact surface 209A to the rear face 209B of the holder section 207, rests in a position shown in FIG. 2(d). As a result, the solar cell module 201 is externally exposed to enable power generation.

The above-described working can be regarded as a mechanism that allows the protection cover 202 to be moved toward the rear face 209B while keeping the solar cell module 201 externally exposed, which in the present specification is referred to as the "moving mechanism".

The holder section 207 according to the present embodiment is not limited to the above construction. The holder section 207 may include at least two supporting members which are linked with each other, and at least one fold line between respective supporting members among the at least two supporting members. One supporting member among the at least two supporting members may have the contact surface 209A, and connect to the connecting portion 208 by way of the other supporting members swingingly connected thereto.

Owing to this moving mechanism, in a state where at least two supporting members are folded onto each other in the form of a bellows, the protection cover 202 having moved in a manner of wrapping around to the rear face 209B rests in the position shown in FIG. 2(d). As a result, the solar cell module 201 is externally exposed, thus enabling power generation even while the mobile electronic device 204 is being manipulated.

Figure 3:
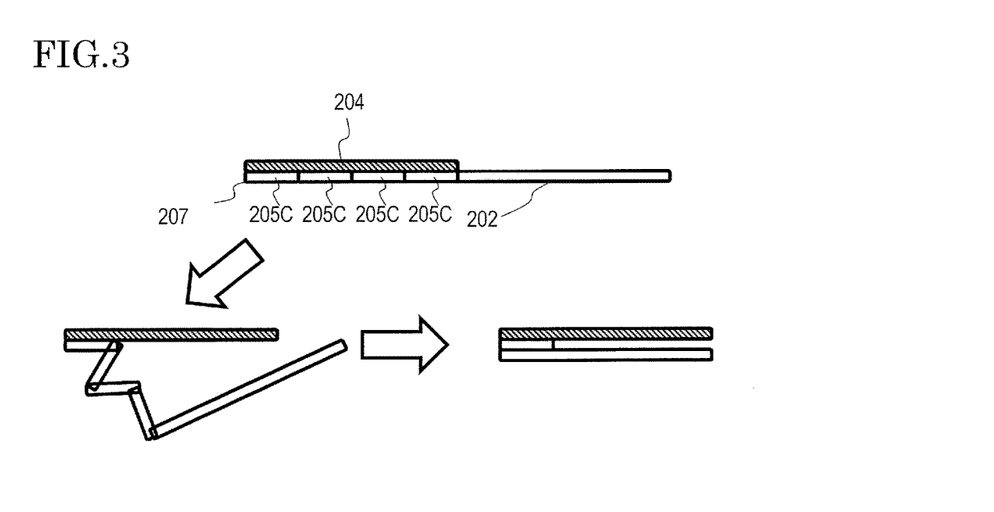
FIG. 3 is a schematic diagram showing how a moving mechanism may work when a holder section 207 according to the first embodiment is split into four supporting members.

FIG. 3 schematically shows how the moving mechanism may work when the holder section 207 is split into four supporting members 205C. The holder section 207 has four supporting members 205C in substantially equal sizes, with mountain-fold lines and valley-fold lines bordering the supporting members. As the four supporting members 205C become folded onto one another in the form of a bellows, the solar cell module 201 is externally exposed, as shown in the figure.

According to the present embodiment, when the mobile electronic device 204 is not in use, by merely leaving the case 200A for a mobile electronic device on a desk or a table, etc., in a state where the display surface 203 is protected, the light-receiving surface of the solar cell module 201 can be adequately irradiated with external light, thus enabling efficient power generation. Moreover, even while the mobile electronic device 204 is being manipulated, the light-receiving surface can be irradiated with scattered light or reflected light in a state where the solar cell module 201 is externally exposed, thus enabling power generation albeit at a lowered illuminance. From this standpoint, as mentioned above, it may be said that a dye-sensitized solar cell module or a solar cell module including a fluorescent light-collecting plate is preferable as the solar cell module 201. Moreover, since the mobile electronic device 204 is accommodated in such a manner that it is entirely covered, it is better protected from impact in a fall or collision.

Hereinafter, a variant of the present embodiment will be described with reference to FIG. 4 and FIG. 5.

Figure 4:
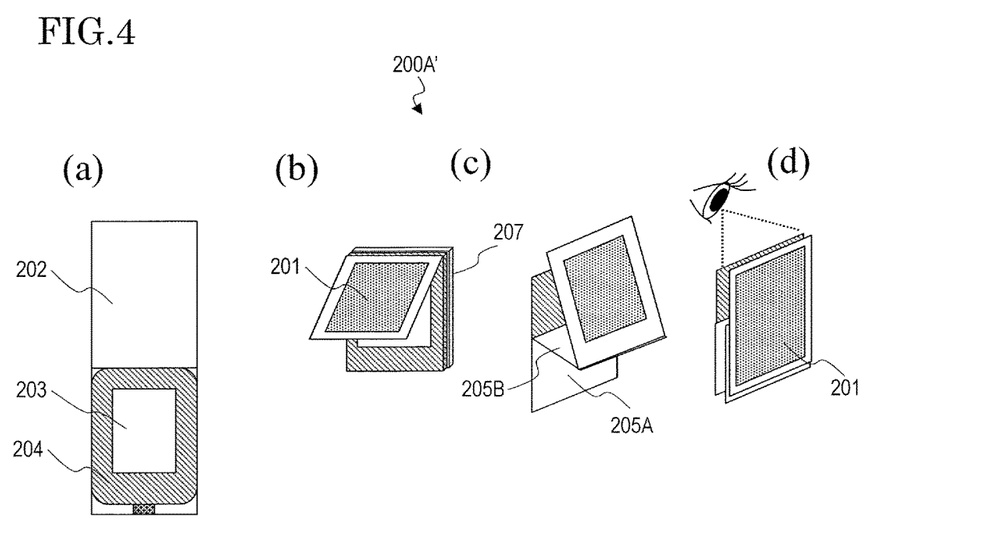
FIG. 4 is an external view schematically showing a case 200A' for a mobile electronic device according to a variant of the first embodiment.

FIG. 4 schematically shows external appearances of a variant case 200A' for a mobile electronic device according to the present embodiment. While the already-described case 200A for a mobile electronic device may be called a "laterally-opening case", the variant case for a mobile electronic device A' may be called a "vertically-opening case".

The protection cover 202 of the case 200A for a mobile electronic device opens and closes in a direction which is substantially parallel to a pair of sides of the display surface 203 (thus opening laterally). On the other hand, the protection cover 202 of the case 200A' for a mobile electronic device opens and closes in a direction which is substantially parallel to another pair of sides of the display surface 203 (thus opening vertically).

Figure 5:
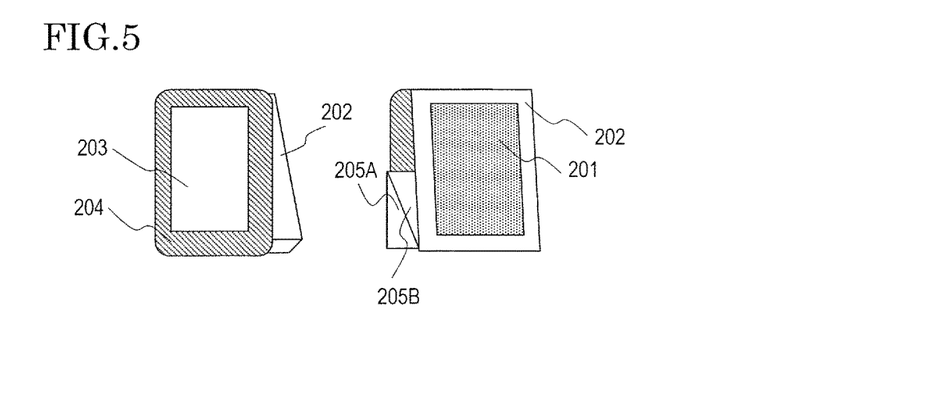
FIG. 5 is an external view schematically showing the case 200A' for a mobile electronic device according to a variant of the first embodiment, where the case is in upright position.

FIG. 5 schematically shows external appearances of the case 200A' for a mobile electronic device in upright position. The moving mechanism may be activated to cause one end of the protection cover 202 to abut with one end of the holder section 207, in such a manner that each side face appears to have a substantially triangular shape when the case 200A' for a mobile electronic device is viewed from one of the side faces, whereby the case 200A' for a mobile electronic device can be placed in upright position. In this case, a sucking magnet may be provided on the one end of each of the protection cover 202 and the holder section 207. Such magnets will keep these ends fixed, whereby the case 200A' for a mobile electronic device can be more stably erected in upright position. In this state, the user is able to view motion videos or the like.

(Second Embodiment)

Figure 6:
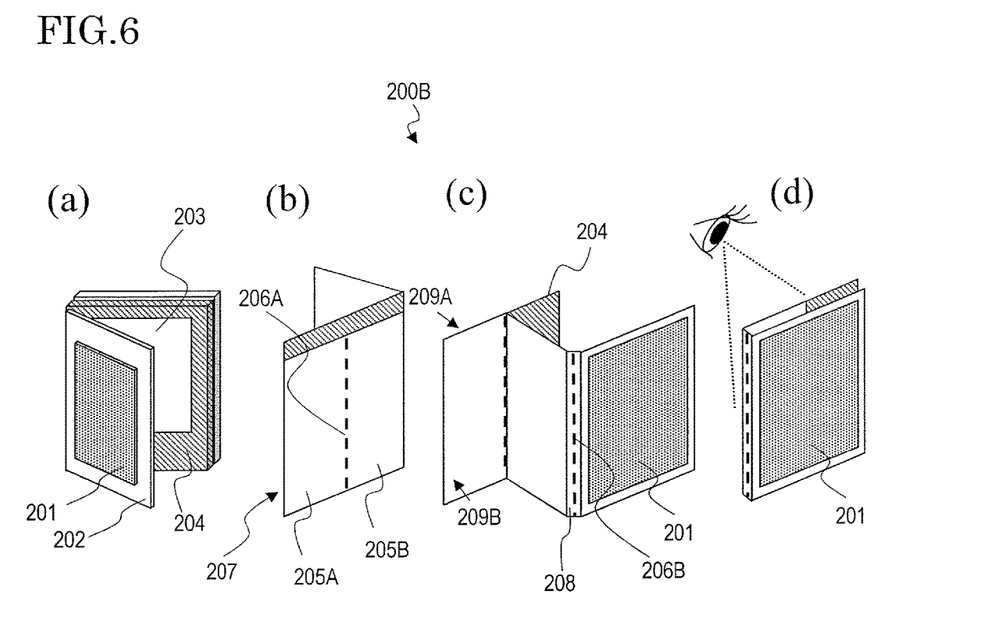
FIG. 6 is an external view schematically showing a case 200B for a mobile electronic device according to a second embodiment.
Figure 7:
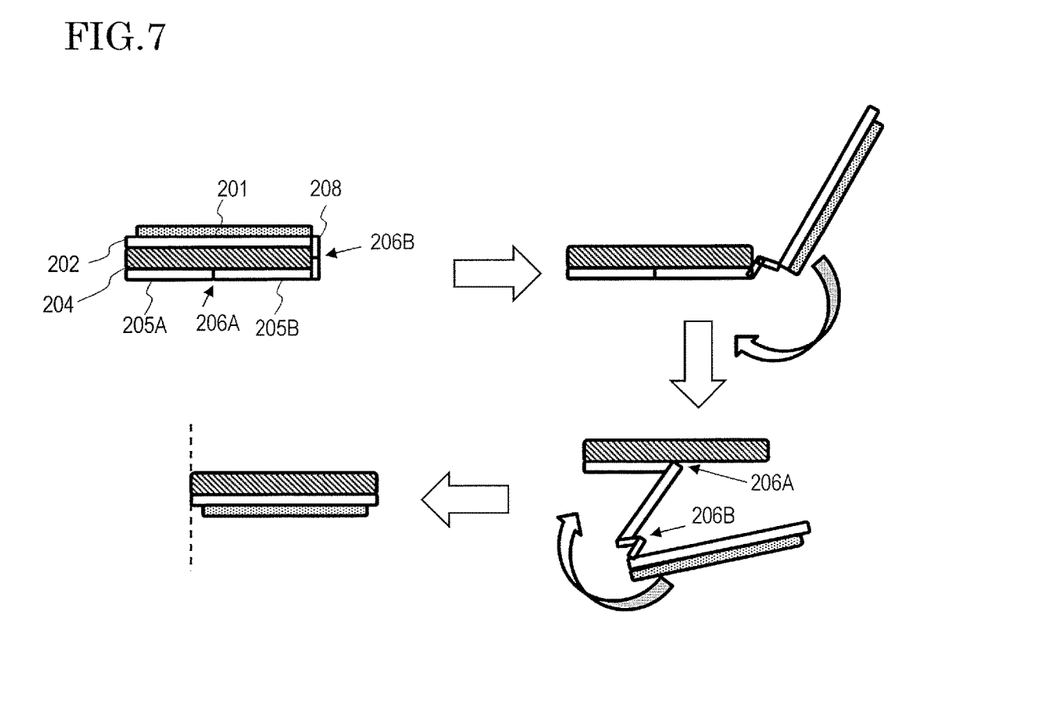
FIG. 7 is a plan view schematically showing how a protection cover 202 according to the second embodiment may be opened or closed.

With reference to FIG. 6 and FIG. 7, the structure and functions of a case 200B for a mobile electronic device according to the second embodiment will be described.

The case 200B for a mobile electronic device according to the present embodiment differs from the case 200A for a mobile electronic device according to the first embodiment in that a valley-fold line 206B is provided in the connecting portion 208. Hereinafter, the differences will mainly be described, while omitting description of the similarities.

FIG. 6 schematically shows external appearances of the case 200B for a mobile electronic device. In FIG. 6, (a) is an external view of the case 200B in a state where the protection cover 202 is open, as the case 200B is viewed from the front; (b) and (c) are external views showing the case 200B in a state where the protection cover 202 is open, as the case 200B is viewed from the back face; and (d) is an external view of the case 200B in a state where the protection cover 202 is positioned at the rear face 209B, as the case 200B is viewed from the back face.

As shown in the figure, the connecting portion 208 has a valley-fold line 206B near the center, thus realizing a foldable structure similarly to the holder section 207. Hereinafter, with reference to FIG. 6, the structure of the connecting portion 208 will be described in detail.

FIG. 7 schematically shows how the protection cover 202 may be opened or closed. When the connecting portion 208 bends while opposing a side face thereof, the valley-fold line 206B as viewed from the exterior flexes inward (i.e., toward the housing). While the valley-fold lines 206A and 206B are flexed inward, the supporting member 205B is folded onto the supporting member 205A. The protection cover 202 having moved in a manner of wrapping around from the contact surface 209A to the rear face 209B stays in place while exposing the solar cell module 201. The connecting portion 208 in this folded state fits within the bounds of the housing of the mobile electronic device 204 (as delineated by a broken line in the figure), without protruding externally.

Figure 8:
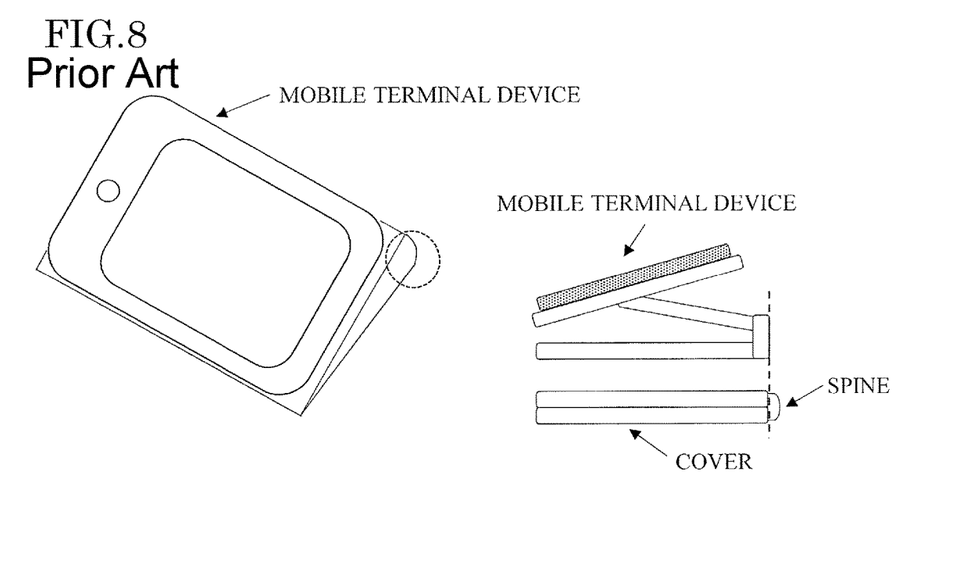
FIG. 8 is a schematic diagram showing a case for a mobile terminal device disclosed in Patent Document 3 being folded up.

FIG. 8 schematically shows the case for a mobile terminal device disclosed in Patent Document 3, where the case is folded up. As shown in the figure, the spine portion of this case for a mobile terminal device described in Patent Document 3 lacks a valley-fold line. Therefore, when the cover is moved over to the back face of the mobile terminal device, the spine portion will protrude externally as much as its thickness allows. Moreover, some freedom is conferred to this cover due to its thickness; since it is not fixed, misalignments are likely to occur.

According to the present embodiment, on the other hand, the foldable structure of the connecting portion 208 ensures that the connecting portion 208 in a folded state fits within the bounds of the housing of the mobile electronic device 204, without protruding externally. Moreover, since the relative position of the protection cover 202 is fixed with respect to the mobile electronic device 204, misalignments are unlikely to occur. Thus, the entire case keeps an integral profile, thus making it easy for the user to handle the mobile electronic device 204 while holding it in the case.

(Third Embodiment)

Figure 9:
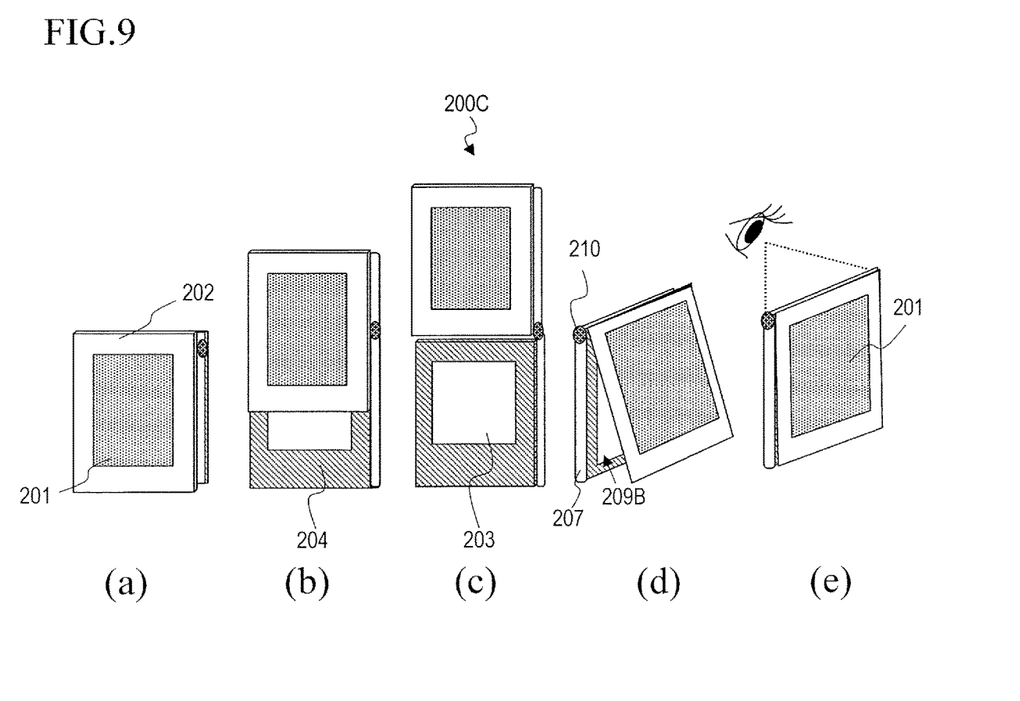
FIG. 9 is an external view schematically showing a case 200C for a mobile electronic device according to a third embodiment.
Figure 11:
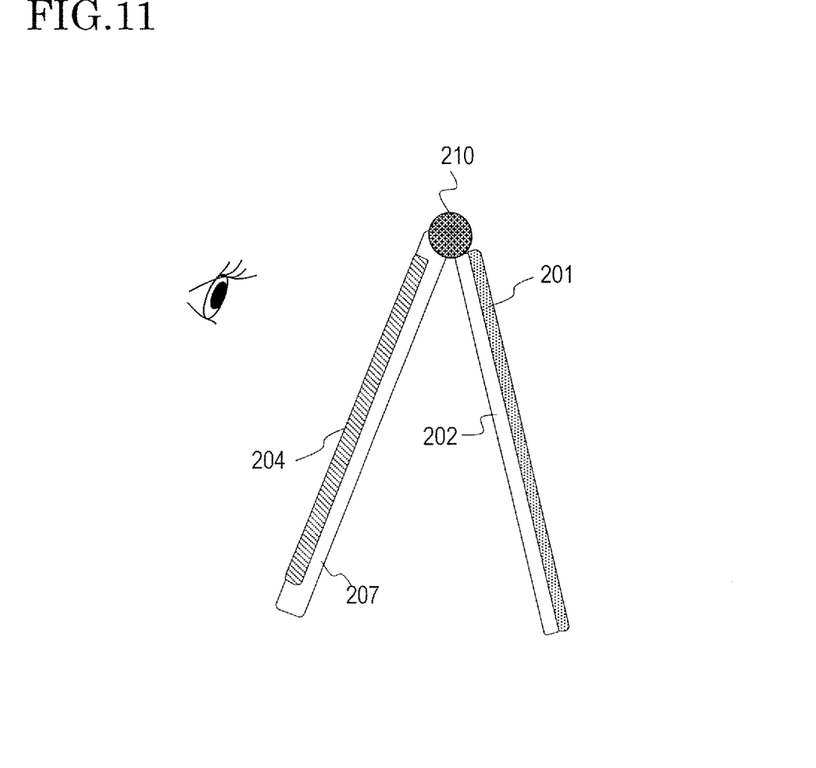
FIG. 11 is a side view showing the case 200C for a mobile electronic device according to the third embodiment, where the case is in upright position.

With reference to FIG. 9 and FIG. 11, the structure and functions of a case 200C for a mobile electronic device according to the third embodiment will be described.

The case 200C for a mobile electronic device according to the present embodiment differs from the case 200A for a mobile electronic device according to the first embodiment in that it is a sliding type case. Hereinafter, the differences will mainly be described, while omitting description of the similarities.

FIG. 9 schematically shows external appearances of the case 200C for a mobile electronic device. FIG. 9(a) shows an external appearance of the case 200C in a state where the protection cover 202 is in a protecting position, as the case 200C is viewed from the front. FIG. 9(b) shows an external appearance of the case 200C in a state where the protection cover 202 has slid from the protecting position, as the case 200C is viewed from the front. FIG. 9(c) shows an external appearance of the case 200C in a state where the protection cover 202 is in a drawn-out position, as the case 200C is viewed from the front. FIG. 9(d) shows an external appearance of the state where the protection cover 202 has rotated around a rotation axis 210, as the case 200C is viewed from the back face. FIG. 9(e) shows an external appearance of the case 200C in a state where the protection cover 202 is positioned at the rear face, as the case 200C is viewed from the back face.

An expansion mechanism 220 allows the protection cover 202 to slide in a direction which is substantially parallel to one side of the display surface 203, between the protecting position (FIG. 9(a)), in which it covers the display surface 203, and the drawn-out position (FIG. 9(c)), in which it has been pulled out of the holder section 207. In addition, when the protection cover 202 is in the drawn-out position, a rotation mechanism allows the protection cover 202 to rotate around the rotation axis 210, which is at one end of the holder section 207 (FIG. 9(d)).

Figure 10A:
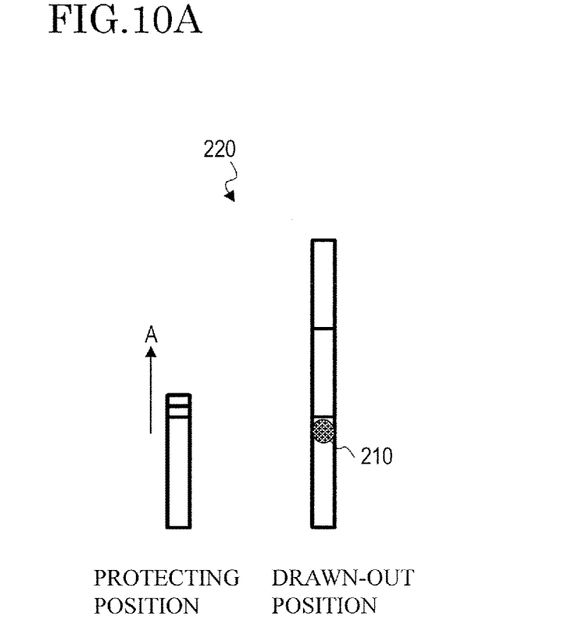
FIG. 10A is a schematic diagram showing the structure of an expansion mechanism 220 according to the third embodiment.

FIG. 10A schematically shows the structure of the expansion mechanism 220. The expansion unit 220, which is structured so as to be capable of contraction and expansion, supports the protection cover 202. When a force is applied in a direction of pulling out (i.e., in the direction of arrow A in the figure), the expansion unit 220 expands to a position corresponding to the drawn-out position (i.e., as depicted by the right illustration), and when a force is applied in the opposite direction, the expansion unit 220 contracts to a position corresponding to the protecting position (i.e., as depicted by the left illustration).

Figure 10B:
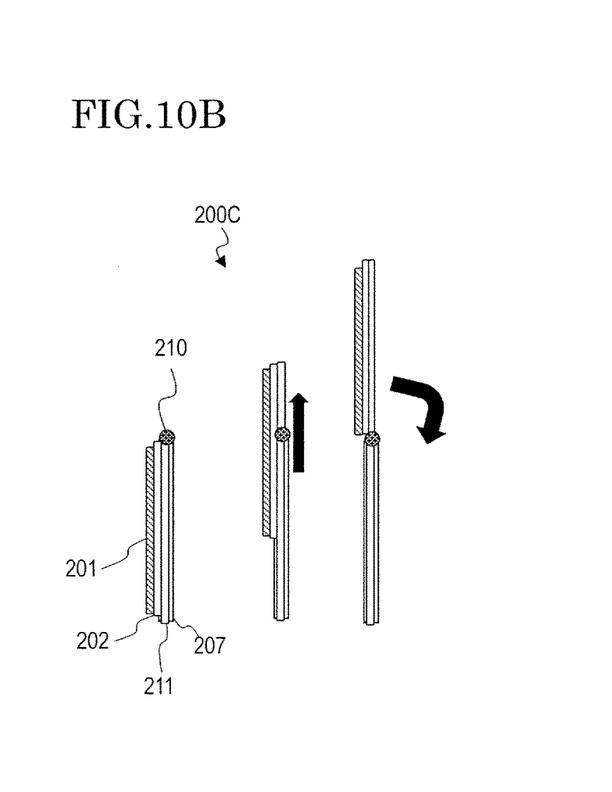
FIG. 10B is a side view schematically showing a case 200C for a mobile electronic device according to the third embodiment.
Figure 10C:
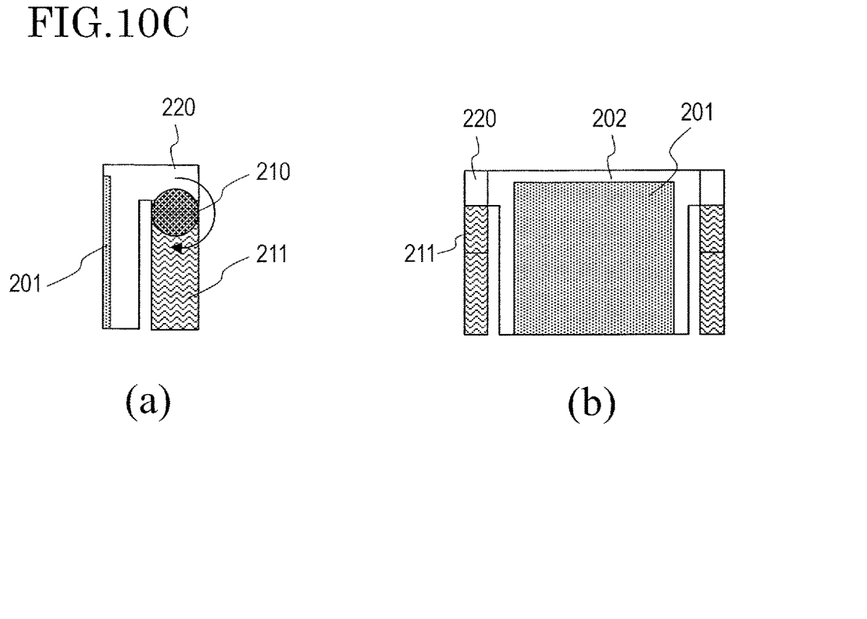
FIG. 10C is an enlarged view of the neighborhood of a rotation axis 210 of the case 200C for a mobile electronic device according to the third embodiment.

FIG. 10B schematically shows a side face of the case 200C for a mobile electronic device. In FIG. 10C, (a) shows enlarged the side face in the neighborhood of the rotation axis 210; and (b) shows enlarged the protection cover 202 at one end thereof. One end of the expansion unit 220 is connected to the one end of the protection cover 202, which has a solar cell module 201 provided thereon. The holder section 207 includes a pair of side-frame members 211 which are provided in parallel to the pair of its own sides, such that the expansion mechanism 220 is fixed to each of the pair of side-frame members 211. Alternatively, the expansion mechanism 220 may be fixed to at least one of the pair of side-frame members 211. This mechanism allows the protection cover 202 to slide between the protecting position and the drawn-out position.

FIG. 9 is referred to again. As shown in FIG. 9(d), when in the drawn-out position, the protection cover 202 is able to rotate approximately 180° around the rotation axis 210, in a manner of wrapping around from that position to the rear face 209B of the holder section 207. Any mechanism which permits such rotation of the protection cover 202 is referred to as the "rotation mechanism". The protection cover 202 having moved in a manner of wrapping around to the rear face 209B of the holder section 207 rests in the position shown in FIG. 9(e). As a result, the solar cell module 201 is externally exposed, thus enabling power generation even while the mobile electronic device 204 is being manipulated.

FIG. 11 schematically shows a state where the case 200C for a mobile electronic device is placed in upright position by rotating the protection cover 202 around the rotation axis 210 by a certain angle. Thus, in upright position, the rotated protection cover 202 can be utilized as a prop. The user is able to view motion videos or the like in this state.

According to the present embodiment, when the mobile electronic device 204 is not in use, by merely leaving the case 200C for a mobile electronic device on a desk or a table, etc., in a state where the display surface 203 is protected, the light-receiving surface of the solar cell module 201 can be adequately irradiated with external light, thus enabling efficient power generation. Moreover, even while the mobile electronic device 204 is being manipulated, the light-receiving surface can be irradiated with scattered light or reflected light in a state where the solar cell module 201 is externally exposed, thus enabling power generation albeit at a lowered illuminance.

(Fourth Embodiment)

Figure 12:
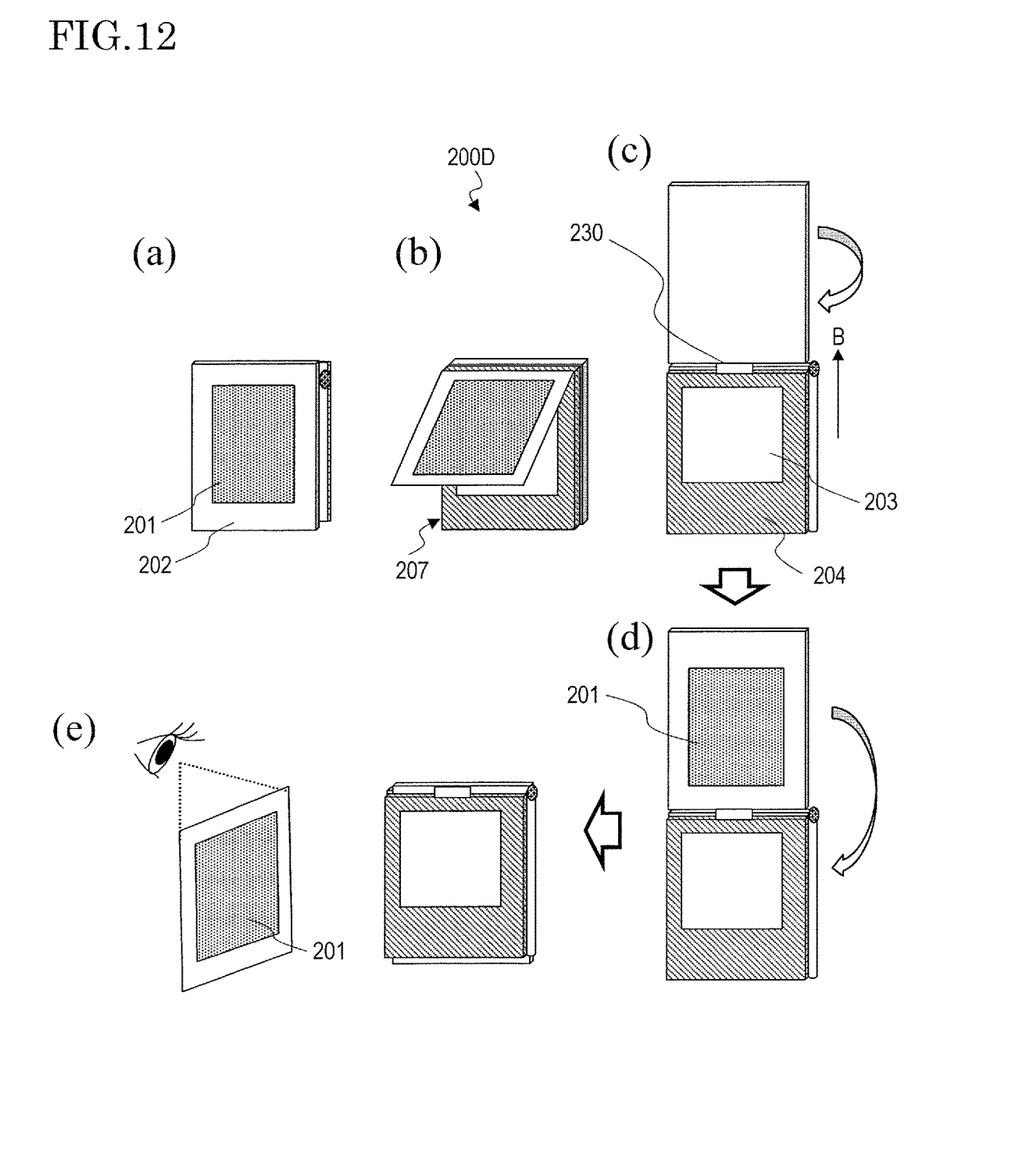
FIG. 12 is an external view schematically showing a case 200D for a mobile electronic device according to a fourth embodiment.
Figure 13:
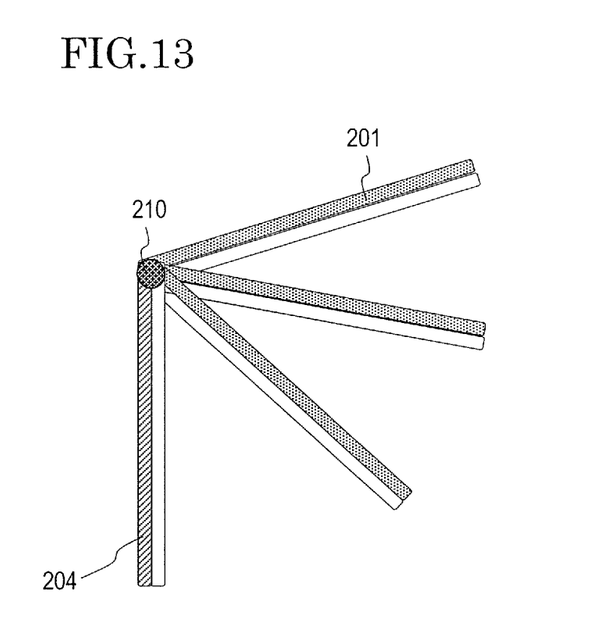
FIG. 13 is a schematic diagram illustrating the ability of a protection cover 202 according to the fourth embodiment to be fixed at arbitrary angles.

With reference to FIG. 12 and FIG. 13, the structure and functions of a case 200D for a mobile electronic device according to the fourth embodiment will be described.

The case 200D for a mobile electronic device according to the present embodiment differs from the case 200A for a mobile electronic device according to the first embodiment in that a hinge 230 connecting one end of the protection cover 202 and one end of the holder section 207 is provided. Hereinafter, the differences will mainly be described, while omitting description of the similarities.

FIG. 12 schematically shows external appearances of the case 200D for a mobile electronic device. FIG. 12(a) shows an external appearance of the case 200D in a state where the protection cover 202 covers the display surface 203, as the case 200D is viewed from the front. FIG. 12(b) shows an external appearance of the case 200D in a state where the protection cover 202 is slightly opened, as the case 200D is viewed from the front. FIG. 12(c) shows an external appearance of the case 200D in a state where the protection cover 202 is completely opened, as the case 200D is viewed from the front. FIG. 12(d) shows an external appearance of the case 200D in a state where the protection cover 202 has rotated approximately 180° around the rotation axis from the completely open state, as the case 200D is viewed from the front. FIG. 12(e) shows an external appearance of the case 200D in a state where the protection cover 202 is positioned at the rear face, as the case 200D is viewed from the front and the back face.

A rotary terminal 230 which connects one end of the protection cover 202 to one end of the holder section 207 is provided therebetween. The rotary terminal 230 is a hinge, for example. The hinge 230 allows the protection cover 202 to transition between a protecting state (FIG. 12(a)) of covering the display surface 203 and an open state (FIG. 12(c)) of extending along the same substantially straight line as the holder section 207 and not covering the display surface 203.

The hinge 230 is structured so as to allow the protection cover 202 in the open state to pivot approximately 180° with respect to the holder section 207, around an axis which is substantially parallel to the direction of arrow B in the figure, and pivotally supports the protection cover 202. As a result, as shown in FIG. 12(d), the protection cover 202 is able to pivot approximately 180° around its pivot axis.

The hinge 230 is structured so that the protection cover 202 is further able to rotate in a manner of wrapping around to the rear face side of the holder section 207, while keeping the solar cell module 201 externally exposed. As a result, the solar cell module 201 remains externally exposed, thus enabling power generation even while the mobile electronic device 204 is being manipulated (FIG. 12(e)).

The rotation axis may be engaged by an interference fit. FIG. 13 schematically illustrates the ability of the protection cover 202 to be fixed at arbitrary angles. Owing to this fit, frictional drag is allowed to act on the rotary slide surface of the axis as needed, thereby enabling the protection cover 202 to be fixed at arbitrary angles.

According to the present embodiment, when the mobile electronic device 204 is not in use, by merely leaving the case 200D for a mobile electronic device on a desk or a table, etc., in a state where the display surface 203 is protected, the light-receiving surface of the solar cell module 201 can be adequately irradiated with external light, thus enabling efficient power generation. Moreover, even while the mobile electronic device 204 is being manipulated, the light-receiving surface can be irradiated with scattered light or reflected light in a state where the solar cell module 201 is externally exposed, thus enabling power generation albeit at a lowered illuminance. Furthermore, the protection cover 202 having rotated to the rear face side can be utilized as a prop for keeping the case 200D for a mobile electronic device in upright position.

As the rotation axis is engaged by an interference fit, the angle of the protection cover 202 can be adjusted arbitrarily. Thus, the light-receiving surface of the solar cell module can be adjusted to an angle at which it is irradiated with most external light, thereby enabling efficient power generation.

If the protection cover 202 is in close contact with the holder section 207, the hand which holds the mobile electronic device 204 in manipulating it may obstruct the light incident on the light-receiving surface of the solar cell module 201. As a result, a shade may form on the light-receiving surface, possibly reducing the amount of generated power. According to the present embodiment, a space which can be created between the protection cover 202 and the holder section 207 makes it less likely for the light incident on the light-receiving surface to be obstructed, so that power generation can efficiently occur.

The present specification discloses cases for a mobile electronic device as described in the Items below.

[Item 1]

A case for a mobile electronic device capable of accommodating a mobile electronic device with a display surface, and supplying electric power to the mobile electronic device, the case comprising:

a holder section having a first face which comes in contact with at least a portion of the mobile electronic device and a second face opposite from the first face;

a protection cover to cover the display surface;

a solar cell module provided on the protection cover to generate electric power, the solar cell module being externally exposed when the display surface is covered by the protection cover; and a moving mechanism capable of moving the protection cover over to the second face side while maintaining the solar cell module in an externally exposed state.

The case for a mobile electronic device described in Item 1 enables efficient power generation even while the mobile electronic device is being manipulated, irrespective of the state of use of the mobile electronic device.

[Item 2]

The case for a mobile electronic device as described in Item 1, further comprising a connecting portion electrically connecting the holder section and the protection cover, the connecting portion swingingly supporting the holder section and the protection cover, wherein the holder section includes at least two supporting members which are linked with each other, and at least one fold line between respective supporting members among the at least two supporting members, one supporting member among the at least two supporting members having the first face and connecting to the connecting portion by way of the other supporting member or other supporting members swingingly connected thereto; and the solar cell module on the protection cover having moved over to the second face side is externally exposed in a state where the at least two supporting members are folded onto each other in the form of a bellows.

The case for a mobile electronic device described in Item 2 provides a book-cover type case which enables efficient power generation even while the mobile electronic device is being manipulated, irrespective of the state of use of the mobile electronic device.

[Item 3]

The case for a mobile electronic device as described in Item 2, wherein, the at least two supporting members include a first supporting member having the first face and a second supporting member;

the at least one fold line is a first valley-fold line between the first and second supporting members, as viewed from the exterior; and the solar cell module on the protection cover having moved over to the second face side is externally exposed in a state where the second supporting member is folded onto the first supporting member so that the first valley-fold line flexes inward as viewed from the exterior.

[Item 4]

The case for a mobile electronic device as described in Item 2 or 3, wherein the connecting portion includes a second valley-fold line as viewed from the exterior.

The case for a mobile electronic device described in Item 4 reduces protrusion of the connecting portion in a folded state.

[Item 5]

The case for a mobile electronic device as described in Item 1, wherein, the moving mechanism includes:

an expansion mechanism being fixed to the holder section and supporting the protection cover, the expansion mechanism allowing the protection cover to slide in a direction which is substantially parallel to one side of the display surface, between a protecting position in which the display surface is covered by the protection cover and a drawn-out position in which the protection cover has been pulled out of the holder section; and a rotation mechanism to, in a state where the solar cell module is externally exposed, allow the protection cover in the drawn-out position to rotate over to the second face side, around a rotation axis which is at one end of the holder section.

The case for a mobile electronic device described in Item 5 provides a sliding type case which enables efficient power generation even while the mobile electronic device is being manipulated, irrespective of the state of use of the mobile electronic device.

[Item 6]

The case for a mobile electronic device as described in Item 1, wherein, the moving mechanism includes a rotary terminal connecting one end of the protection cover to one end of the holder section, the rotary terminal allowing the protection cover to rotate over to the second face side;

the protection cover is capable of transitioning between a protecting state of covering the display surface and an open state of extending along a same substantially straight line as the holder section and not covering the display surface; and the rotary terminal pivotally supports the protection cover to allow the protection cover in the open state to pivot approximately 180° with respect to the holder section, around an axis which is substantially parallel to the substantially straight line.

The case for a mobile electronic device described in Item 6 provides a foldable case which enables efficient power generation even while the mobile electronic device is being manipulated, irrespective of the state of use of the mobile electronic device.

[Item 7]

The case for a mobile electronic device as described in Item 6, wherein a rotation axis around which the protection cover is allowed to rotate over to the second face side is engaged by an interference fit.

The case for a mobile electronic device described in Item 7 allows the angle of the solar cell module to be adjusted arbitrarily, thus enabling efficient power generation.

[Item 8]

The case for a mobile electronic device as described in any of Items 1 to 7 further comprising a power supplying unit, the power supplying unit including a control circuit which tracks an optimum operating point of the solar cell module and supplying electric power from the solar cell module to a load.

The case for a mobile electronic device described in Item 8 enables efficient power generation.

[Item 9]

The case for a mobile electronic device as described in Item 8, further comprising a rechargeable battery to store the electric power from the solar cell module, the rechargeable battery being connected to the power supplying unit.

The case for a mobile electronic device described in Item 9 provides a case equipped with a charger, the case including a rechargeable battery which efficiently stores the electric power from the solar cell module.

[Item 10]

The case for a mobile electronic device as described in any of Items 1 to 9, wherein the solar cell module is a dye-sensitized solar cell module or a solar cell module including a fluorescent light-collecting plate.

The case for a mobile electronic device described in Item 10 enables power generation in an illuminance range from low illuminance to high illuminance.

The present invention is applicable to a case for a mobile electronic device, where the case includes a solar cell module.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2015-062556 filed in the Japanese Patent Office on Mar. 25, 2015, the entire contents of which are hereby incorporated by reference.

What is claimed is:

1. A case for a mobile electronic device capable of accommodating a mobile electronic device with a display surface, and supplying electric power to the mobile electronic device, the case comprising:

a holder section having a first face which comes in contact with at least a portion of the mobile electronic device and a second face opposite from the first face;

a protection cover to cover the display surface;

a solar cell module provided on the protection cover to generate electric power, the solar cell module being externally exposed when the display surface is covered by the protection cover;

a connecting portion electrically connecting the holder section and the protection cover, the connecting portion swingingly supporting the holder section and the protection cover; and a moving mechanism capable of moving the protection cover over to the second face side while maintaining the solar cell module in an externally exposed state; wherein the holder section includes at least two supporting members which are linked with each other, and at least one fold line between respective supporting members among the at least two supporting members, one supporting member among the at least two supporting members having the first face and connecting to the connecting portion by way of the other supporting member or other supporting members swingingly connected thereto; and the solar cell module on the protection cover having moved over to the second face side is externally exposed in a state where the at least two supporting members are folded onto each other in the form of a bellows.

2. The case for a mobile electronic device of claim 1, wherein,
the at least two supporting members include a first supporting member having the first face and a second supporting member;
the at least one fold line is a first valley-fold line between the first and second supporting members, as viewed from the exterior; and
the solar cell module on the protection cover having moved over to the second face side is externally exposed in a state where the second supporting member is folded onto the first supporting member so that the first valley-fold line flexes inward as viewed from the exterior.

3. The case for a mobile electronic device of claim 1, wherein the connecting portion includes a second valley-fold line as viewed from the exterior.

4. The case for a mobile electronic device of claim 1, further comprising a power supplying unit, the power supplying unit including a control circuit which tracks an optimum operating point of the solar cell module and supplying electric power from the solar cell module to a load.

5. The case for a mobile electronic device of claim 4, further comprising a rechargeable battery to store the electric power from the solar cell module, the rechargeable battery being connected to the power supplying unit.

6. The case for a mobile electronic device of claim 1, wherein the solar cell module is a dye-sensitized solar cell module or a solar cell module including a fluorescent light-collecting plate.

7. A case for a mobile electronic device capable of accommodating a mobile electronic device with a display surface, and supplying electric power to the mobile electronic device, the case comprising:
a holder section having a first face which comes in contact with at least a portion of the mobile electronic device and a second face opposite from the first face;
a protection cover to cover the display surface;
a solar cell module provided on the protection cover to generate electric power, the solar cell module being externally exposed when the display surface is covered by the protection cover; and
a moving mechanism capable of moving the protection cover over to the second face side while maintaining the solar cell module in an externally exposed state, wherein,
the moving mechanism includes:
an expansion mechanism being fixed to the holder section and supporting the protection cover, the expansion mechanism being structured so as to be capable of contraction and expansion, and the expansion mechanism allowing the protection cover to slide in a direction which is substantially parallel to one side of the display surface, between a protecting position in which the display surface is covered by the protection cover and a drawn-out position in which the protection cover has been pulled out of the holder section; and
a rotation mechanism to, in a state where the solar cell module is externally exposed, allow the protection cover in the drawn-out position to rotate over to the second face side, around a rotation axis which is at one end of the holder section.

8. The case for a mobile electronic device of claim 7, further comprising a power supplying unit, the power supplying unit including a control circuit which tracks an optimum operating point of the solar cell module and supplying electric power from the solar cell module to a load.

9. The case for a mobile electronic device of claim 8, further comprising a rechargeable battery to store the electric power from the solar cell module, the rechargeable battery being connected to the power supplying unit.

10. The case for a mobile electronic device of claim 7, wherein the solar cell module is a dye-sensitized solar cell module or a solar cell module including a fluorescent light-collecting plate.

11. A case for a mobile electronic device capable of accommodating a mobile electronic device with a display surface, and supplying electric power to the mobile electronic device, the case comprising:
a holder section having a first face which comes in contact with at least a portion of the mobile electronic device and a second face opposite from the first face;
a protection cover to cover the display surface;
a solar cell module provided on the protection cover to generate electric power, the solar cell module being externally exposed when the display surface is covered by the protection cover; and
a moving mechanism capable of moving the protection cover over to the second face side while maintaining the solar cell module in an externally exposed state, wherein
the moving mechanism includes a rotary terminal connecting one end of the protection cover to one end of the holder section, the rotary terminal allowing the protection cover to rotate over to the second face side;
the protection cover is capable of transitioning between a protecting state of covering the display surface and an open state of extending along a same substantially straight line as the holder section and not covering the display surface;
the rotary terminal pivotally supports the protection cover to allow the protection cover in the open state to pivot approximately 180° with respect to the holder section, around an axis which is substantially parallel to the substantially straight line; and
a rotary slide surface around which the protection cover is allowed to rotate over to the second face side is engaged by an interference fit.

12. The case for a mobile electronic device of claim 11, further comprising a power supplying unit, the power supplying unit including a control circuit which tracks an optimum operating point of the solar cell module and supplying electric power from the solar cell module to a load.

13. The case for a mobile electronic device of claim 12, further comprising a rechargeable battery to store the electric power from the solar cell module, the rechargeable battery being connected to the power supplying unit.

14. The case for a mobile electronic device of claim 11, wherein the solar cell module is a dye-sensitized solar cell module or a solar cell module including a fluorescent light-collecting plate.

* * * * *